US006928894B2

(12) United States Patent
Falcou et al.

(10) Patent No.: US 6,928,894 B2
(45) Date of Patent: Aug. 16, 2005

(54) COMPENSATED ACTUATOR WITH OPTIMIZED POWER

(75) Inventors: Gérard Falcou, Sollies-Toucas (FR); Gérard Yves Mothier, Le Pradet (FR); Bruno Robert Thieffry, Le Pradet (FR); Jean-Marie Coda, La Crau (FR)

(73) Assignee: Societe Eca, Boulogne-Billancourt Cedex (FR)

( * ) Notice: Subject to any disclaimer, the term of this patent is extended or adjusted under 35 U.S.C. 154(b) by 5 days.

(21) Appl. No.: 10/082,163

(22) Filed: Feb. 26, 2002

(65) Prior Publication Data

US 2002/0129699 A1 Sep. 19, 2002

(30) Foreign Application Priority Data

Feb. 26, 2001 (FR) ........................................... 01 02588

(51) Int. Cl.[7] ......................... F16H 27/02; F16H 29/02; F01B 21/04

(52) U.S. Cl. .................... 74/89.25; 74/89.26; 74/89.43; 160/188; 60/709

(58) Field of Search ...................... 74/89, 89.25, 89.26, 74/89.29, 89.32, 89.43, 459, 499, 89.16, 424.86; 160/188; 60/709

(56) References Cited

U.S. PATENT DOCUMENTS

| | | | | |
|---|---|---|---|---|
| 2,476,376 A | * | 7/1949 | Laraque | 60/709 |
| 2,620,683 A | * | 12/1952 | Geyer | 74/89.25 X |
| 2,918,786 A | * | 12/1959 | Geyer | 74/89.25 X |
| 3,026,850 A | | 3/1962 | Clifton et al. | |
| 3,823,758 A | | 7/1974 | Heese | |
| 4,586,394 A | * | 5/1986 | Perkins | 74/89.43 |
| 4,603,594 A | * | 8/1986 | Grimm | 74/89.39 |
| 4,635,491 A | * | 1/1987 | Yamano et al. | 74/89.41 |
| 4,876,906 A | * | 10/1989 | Jones | 74/89.16 |
| 5,070,969 A | * | 12/1991 | Neumuller | 188/134 |
| 5,092,539 A | * | 3/1992 | Caero | 74/424.86 |
| 5,485,760 A | * | 1/1996 | Lange | 74/459.5 |
| 5,778,733 A | * | 7/1998 | Stringer | 74/527 |
| 5,832,779 A | * | 11/1998 | Madrid et al. | 74/89.39 |
| 6,068,448 A | * | 5/2000 | Muratsubaki et al. | 417/44.2 |
| 6,079,287 A | * | 6/2000 | Nagata | 74/89.39 |
| 6,158,295 A | * | 12/2000 | Nielsen | 74/89.38 |
| 6,196,361 B1 | * | 3/2001 | Russ et al. | 188/161 |
| 6,272,947 B1 | * | 8/2001 | Howard | 74/499 |

FOREIGN PATENT DOCUMENTS

| | | |
|---|---|---|
| DE | 1 202 957 | 10/1965 |
| EP | 0 070 811 | 1/1983 |

* cited by examiner

*Primary Examiner*—David A. Bucci
*Assistant Examiner*—Colby Hansen
(74) *Attorney, Agent, or Firm*—Young & Thompson

(57) ABSTRACT

An actuator combining mechanical and hydraulic forces includes a cylindrical body and a piston that can slide relative to the cylindrical body. The piston and the cylindrical body are connected by a mechanical system for transmitting mechanical power that constitutes a device that permanently controls the position of the actuator, a permanent locking device, and a safety device. The device for transmitting hydraulic power constitutes a load compensator device. The two power transmitting devices operate in parallel. Position control using the drive system at reduced power can be synchronized in a simple way for a plurality of actuators.

13 Claims, 3 Drawing Sheets

COMPENSATED ACTUATOR WITH OPTIMIZED POWER

BACKGROUND OF THE INVENTION

The present invention relates to an actuator for raising or moving a variable or fixed load. The invention relates more particularly to an actuator designed to minimize the power required to operate it and to have a simple means of controlling with great accuracy the speed and position of the load controlled by the actuator.

Actuators used to move large loads must be rated to support the maximum load that will be applied to them, which leads to the use of high-power actuators, without all of that power being indispensable at all times.

A plurality of actuators can be used, depending on the size of the load, its disposition, or the movements to be imparted to the load. In the case of large masses, load compensation is applied, for example using a counterweight or a mechanical spring. Precise movement of a load by a plurality of actuators necessitates delicate synchronization of the actuators.

European Patent EP-A-0070811 (SELENIA INDUSTRIE) describes a hydraulic actuator supplied by a pump and whose hydraulic circuit includes distributor valves. The actuator is provided with a mechanical hydraulically or manually operated safety system. The piston of the actuator includes a cavity in which a reversible screw-and-nut system is accommodated. The screw is constrained to move with the piston in translation and in rotation. The nut is mounted to rotate in the body of the actuator, but it can be held by a locking finger that is active by default, unlocked manually or hydraulically, and acts on the outside portion of a free-wheel fastened to the nut.

Extending the actuator causes the reversible screw-and-nut system to rotate the nut in the direction that is always permitted by the free-wheel. On the other hand, retracting the actuator rotates the nut in the direction in which it rotates the outside portion of the free-wheel, with the result that the piston can be retracted only if the locking finger that acts on the outside portion of the free-wheel is unlocked. Because the locking finger is de-activated manually or hydraulically, this guarantees that the retraction of the actuator is intentional, and is not due to a loss of hydraulic power.

The hydraulic pump must be rated for the maximum load that the actuator must support. It will therefore be overrated for many uses.

The accuracy of the movement of the actuator depends on the solenoid valve and the pump. For some uses, such as moving a large load with great accuracy, for example for an assembly operation or when using several actuators simultaneously to lift a load accurately, these systems are not sufficiently accurate, because it is difficult to control their position and to synchronize them.

The hydraulic power supply circuit, which includes a hydraulic pump, a solenoid valve, an oil reservoir and several hydraulic pipes, is both bulky and costly, and can cause breakdowns that can cause the hydraulic power supply to fail.

It may be desirable to hold the actuator in a precise position and under a particular load for a long period of time. It is then advantageous not to have to supply energy to hold the actuator in that precise position. The actuator described in European Patent EP-A-0070811 (SELENIA INDUSTRIE) can be locked mechanically. The necessary accuracy cannot be obtained, however. The locking finger acts on the outside portion of a toothed free-wheel. The locking positions are therefore discrete, not infinite.

SUMMARY OF THE INVENTION

The invention proposes an actuator using a hydraulic power supply or reservoir and a mechanical power supply.

The invention proposes an actuator having accurate and permanent position control means, effective locking means providing an infinity of positions, a reliable safety device and an integral load compensator device.

The actuator in accordance with one aspect of the invention includes a cylindrical body, a piston adapted to slide relative to the body, means for transmitting mechanical power to said piston, which also constitute means for controlling the position of the piston, and means for transmitting hydraulic power to said piston.

The hydraulic power supplied to the piston is sufficient for the mechanical power supplied to the piston to control the position of the load via the position of the actuator. The means for transmitting hydraulic power therefore constitute a load compensator device integrated into the actuator. A low-power and more economical mechanical power supply can therefore be used.

The means for transmitting the mechanical power can be non-reversible. As a result of this, only the means for transmitting the mechanical power control the position of the piston, and therefore also constitute means for locking the position of the actuator which require no additional input of energy to maintain its position and thus constitute a failsafe device. Failure of the hydraulic or mechanical power supply does not lead to unintentional movement of the actuator.

The actuator has an architecture which simplifies the hydraulic and mechanical power supplies. The hydraulic power supply is simple and economical and can be adapted to suit each use. This feature offers great flexibility in using the actuator.

What is more, the means for transmitting mechanical power being the only means of controlling the position of the actuator, a plurality of actuators according to the invention can be supplied by the same hydraulic power supply or reservoir.

The invention proposes an actuator including an integral hydraulic load compensator, which simplifies its use and reduces its overall size. The actuator then requires a low input of mechanical power, allowing the use of an economical mechanical power supply. The load compensator operates independently of position control.

The means for transmitting the mechanical power to the piston preferably take the form of a reversible or irreversible screw-and-nut system, for example with a safety brake. The position of the piston is therefore controlled via the rotation of either the screw or the nut, depending on the embodiment. This form of control is accurate. As the hydraulic power supply or reservoir provides most of the force, the power needed to control the position of the piston via the screw or the nut is low. The non-reversible screw-and-nut system also constitutes a locking system which has an infinite number of locking positions and necessitates no additional input of energy to maintain a required position. It also constitutes a safety device, since it prevents movement of the actuator in the event of failure of the mechanical or hydraulic power supply, regardless of where a failure occurs in the hydraulic power supply.

The mechanical power is advantageously supplied by a motor coupled to the screw or to the nut, either directly or through a reducer.

The actuator advantageously has a servocontrol system for controlling the motor and therefore the position of the actuator. The servocontrol system can include sensors for sensing the position and the speed of the piston relative to the cylindrical body or for sensing rotation of the motor shaft.

The hydraulic power reservoir is preferably a hydropneumatic accumulator. The hydropneumatic accumulator acts on a volume of oil that communicates with a chamber, one wall of which consists of the piston. The piston receives the hydraulic power stored in the accumulator. The hydraulic power supply circuit is then simple, reliable and economical. It has the additional advantage of being compact and having moderate maintenance requirements. The accumulator supplies high hydraulic power continuously, the contribution of which to the movement of the piston is controlled by the screw-and-nut system. A hydropneumatic accumulator of this kind is easily replaced or adapted for a specific use of the actuator. Depending on the load to be moved, a more or less powerful accumulator is used. All of the hydraulic power supplied by the hydropneumatic accumulator to move a load can be recovered at the end of use of the actuator, if required. Using a hydropneumatic accumulator maintains a substantially constant pressure regardless of the stroke of the piston.

The means for transmitting hydraulic power and the means for transmitting mechanical power are advantageously coaxial. The overall size is therefore small and integration into a mechanical assembly is easy. Moreover, the coaxial action of the mechanical and hydraulic forces guarantees high-strength mechanical components, which facilitates the design of the actuator. Moreover, the use of the actuator is simplified. It requires few devices for fixing on the load.

BRIEF DESCRIPTION OF THE DRAWINGS

The present invention and its advantages will be better understood after studying the detailed description of embodiments given by way of nonlimiting example and shown in the accompanying drawings.

DETAILED DESCRIPTION OF THE PREFERRED EMBODIMENTS

Figure 1:
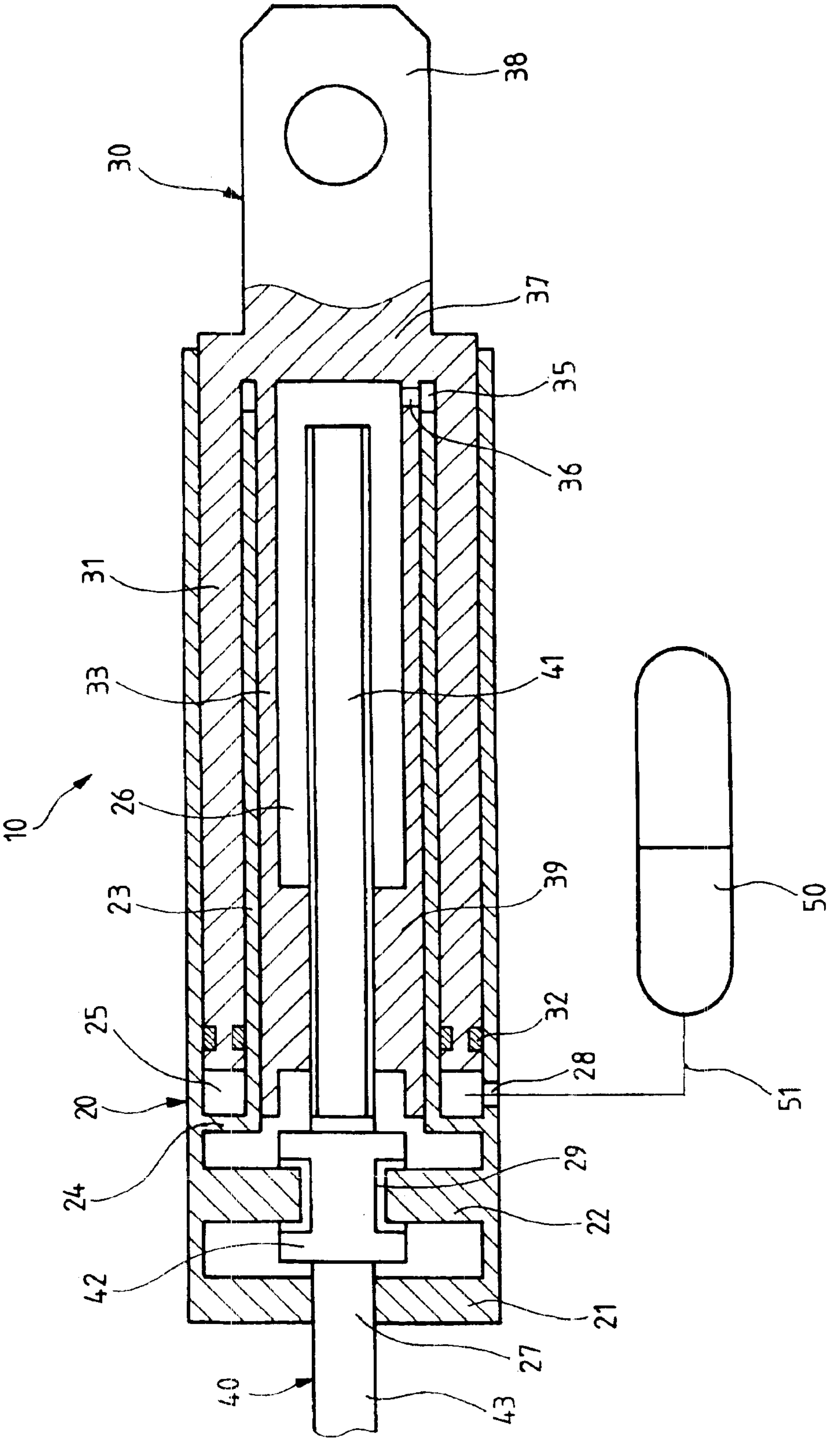
FIG. 1 is a view in longitudinal section of an actuator in accordance with one aspect of the invention.

The actuator 10 in accordance with one aspect of the invention includes a cylindrical body 20 and a piston 30 sliding relative to said cylindrical body 20. The cylindrical body 20 has one end closed by a first radial wall 21 pierced by an orifice 27. The cylindrical body 20 has a second radial wall 22 close to the first wall 21 and pierced by a hole 29 to receive rotatably a screw 40 mounted coaxially with the main axis of the cylindrical body 20 and mounted to rotate on said second wall 22. The radial wall 22 is separated from the radial wall 21 by an interstice. The cylindrical body 20 includes a cylindrical third interior wall 23, coaxial with the cylindrical body 20, connected by an annular radial wall 24 to the cylindrical body at the same end as the first wall 21 closing the cylindrical body, so that the third wall 23 defines a cylindrical first chamber 26 and an annular second chamber 25 in the cylindrical body. The cylindrical wall 23 has a length equivalent to the stroke of the actuator. The walls 22 and 24 are separated by an interstice.

The piston 30 has a cylindrical base 37 disposed in a radial plane facing the axis of the cylindrical body 20. The piston 30 includes an elongate cylindrical first wall 31 adapted to slide in the annular chamber 25 of the cylindrical body 20, substantially equal in length to the chamber, and fastened to the base 37 at the end opposite the closed end of the cylindrical body 20. The cylindrical first wall 31 defines a volume inside the annular chamber 25 at the same end as the closed end of the cylindrical body. The cylindrical wall 31 has seals 32 near its free end. The cylindrical body 20 is pierced by an orifice 28 for feeding the aforementioned volume with a fluid, for example oil, under pressure. The means for transmitting the volume forms means for transmitting hydraulic power to the piston 30.

The piston 30 includes a cylindrical second wall 33 coaxial with the cylindrical first wall 31, of equivalent length, and having a smaller diameter than the cylindrical first wall 31, so that it penetrates into the cylindrical chamber 26 of the cylindrical body 20. The cylindrical second wall 33 of the piston 30 is fastened to the base 37 at the end opposite the closed end of the cylindrical body 20. The base 37 receives a fixing device 38 which, once fixed to the load, prevents any rotation of the piston 30 about the axis of the cylindrical body 20.

The configuration of the piston 30 shown in this nonlimiting example is such that deploying the piston 30 creates a volume 35 between the cylindrical wall 31 of the piston 30, the cylindrical wall 33, and the cylindrical wall 23 of the cylindrical body 20. To maintain this volume at atmospheric pressure, an orifice 36 can be formed in the cylindrical wall 33 of the piston 30, for example, which connects the volume 35 and the chamber 26 of the cylindrical body 20. Alternative solutions would not modify the fundamental features of the invention.

The cylindrical second wall 33 of the piston 30 includes a nut 39 fastened to the cylindrical second wall 33 of the piston and which fits onto the threaded part 41 of the screw 40. The screw 40 is mounted to rotate on the second wall 22 of the cylindrical body 20. The length of the threaded part 41 is substantially equal to the stroke of the actuator. The screw 40 projects through the orifice 27 in the first wall 21 of the cylindrical body 20. Its end 43 is adapted to be driven in rotation either directly or via a reducer, not shown in the drawing.

The piston 30 is moved only by rotation of the screw 40. The example considered here is not limiting on the invention. A second embodiment could associate the screw with the piston and the nut with the cylindrical body.

The actuator has a hydraulic power supply. This supply feeds the volume defined by the annular chamber 25 and the cylindrical first wall 31 of the piston 30. It is adapted to supply the greater part of the force necessary to move the load concerned. Control of the position of the piston 30 by the screw-and-nut system enables the preferred use of a hydraulic power supply, such as the hydropneumatic accumulator 50 shown in the figure. The energy stored by the hydropneumatic accumulator 50 is transmitted to the piston 30. It compensates the weight of the load to be moved with the aid of the actuator. Obviously, any hydraulic power supply other than a hydropneumatic accumulator can be used.

The screw 40 includes a ring 42 adapted to be mounted to rotate in the hole 29 in the wall 22 of the cylindrical body 20, preventing movement in translation. It includes a portion 43 which projects to the outside of the cylindrical body 20 through an orifice 27 in the wall 21 of the cylindrical body. This portion 43 is adapted to be driven in rotation, either directly or via a reducer, not shown in the figure.

Depending on the situation, the system operates in different ways:

In the situation in which it is desired to deploy the piston and the hydraulic power supplied to the piston is greater than the power needed to move the load, only rotation of the screw deploys the piston.

In the situation in which it is desired to deploy the piston and the hydraulic power supplied to the piston is less than the power needed to move the load, the screw-and-nut system prevents retraction of the piston. Only rotation of the screw provides the additional input of mechanical power needed to move the load and deploy the piston.

In the situation in which it is desired to retract the piston and the hydraulic power supplied to the piston is less than the power needed to move the load, the screw-and-nut system prevents retraction of the piston with or without additional input of power, depending on the embodiment. Only rotation of the screw can retract the piston.

In the situation in which it is desired to retract the piston and the hydraulic power supplied to the piston is greater than the power necessary to move the load, the screw-and-nut system prevents deployment of the piston. Only rotation of the screw can provide the additional input of mechanical power necessary to move the load and retract the piston. With the aid of the load, the hydraulic power stored in the accumulator is recovered.

The actuator combines means for transmitting hydraulic power and means for transmitting mechanical power which act in parallel and which are disposed coaxially. Thus there is obtained an actuator with an integral load compensator device which is compact and easy to use. The synchronization of forces is natural.

The actuator has a single volume supplied with hydraulic power. This feature simplifies the hydraulic power supply circuit. A more powerful or less powerful accumulator is used, depending on the weight of the load concerned. The hydraulic circuit consists of a pipe 51 exiting the hydropneumatic accumulator 50 and connected to the orifice 28 by means of a connector that is not shown in the drawing. It is therefore a very simple matter to change accumulator. The simplicity of the supply circuit is an additional guarantee of the reliability of the system.

A hydraulic pump can be used as the power supply if desired, or any other form of hydraulic power supply. The safety device further simplifies the hydraulic power supply system.

The actuator is mainly designed for moving a load creating a force in the direction of the closed end of the cylindrical body 20. A different design of the piston and the chamber 25 produces an actuator designed for a load creating a resultant force on the actuator in the opposite direction. Designing an actuator able to create a force in both directions can also be envisaged, using a second chamber for transmitting the hydraulic power. It will then be necessary to use a device for controlling the pressure in both chambers.

Figure 2:
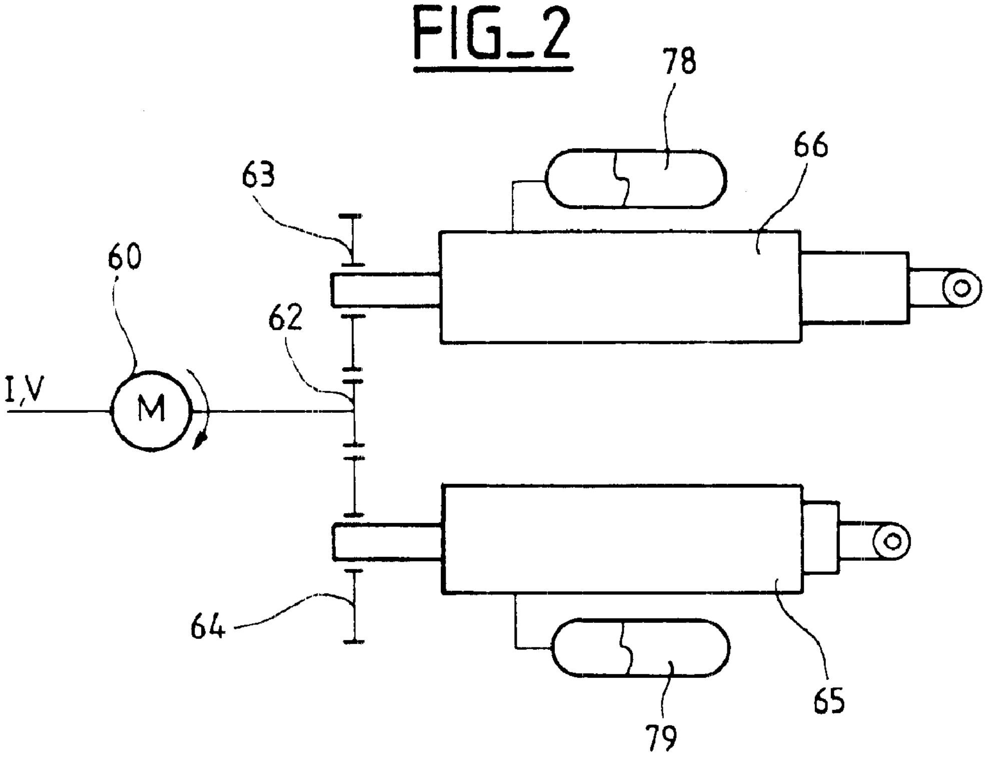
FIG. 2 is a diagrammatic view of mechanically synchronized actuators in accordance with one aspect of the invention.

In the case of combining a plurality of actuators, the simple and reliable design of the means for controlling the position of the actuator, requiring little power, facilitates synchronizing a plurality of actuators:

FIG. 2 shows one example of the disposition of two mechanically synchronized actuators 66 and 65, as described previously, and the same reference numbers for which are used again. Each actuator 66 and 65 has its own hydraulic power reservoir 78 and 79, respectively. The actuators 66 and 65 must have an action that is always synchronized in the same manner. To this end, the actuators 66 and 65 have a single mechanical power supply, for example a reversible electric motor 60. A different mechanical power supply can be used, such as a hydraulic motor or a pneumatic motor. The shaft of the motor 60 drives the toothed wheel 62. On one side the toothed wheel 62 drives rotation of the gear 63 constrained to rotate with the screw 40 of the actuator 66. On the other side the toothed wheel 62 drives rotation of the gear 64 constrained to rotate with the screw 40 of the actuator 65. In this case, if the various actuators must not be deployed at the same speed, they can have different reducers or even different thread pitches. The actuators can have different orientations, which are modified during kinematic movements of the device. A device of the above kind can be used to move loads such as truck bodies or for devices including parallel robots.

Figure 3:
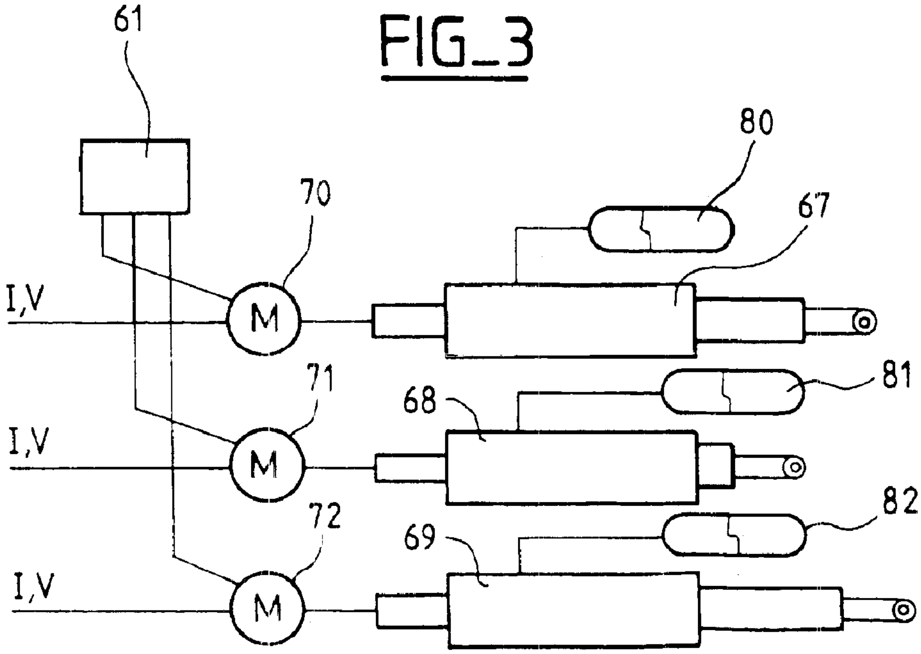
FIG. 3 is a diagrammatic view of actuators in accordance with one aspect of the invention synchronized by a central control unit.

FIG. 3 shows one example of the disposition of three actuators 67, 68 and 69 as previously described, each having its own hydraulic power reservoir 80, 81 and 82, respectively, and a respective reversible electric motor 70, 71 and 72. The motors 70, 71 and 72 drive rotation of the screws 40 of the respective actuators 67, 68 and 69. Rotation of the motors 70, 71 and 72 is controlled by a central control unit 61, which synchronizes their movements. This type of disposition can be used to synchronize the movements of different actuators, as in the case of a flight simulator reproducing the motion of the cockpit of an aircraft. The actuators can have different orientations which are modified during kinematic movements of the device.

Figure 4:
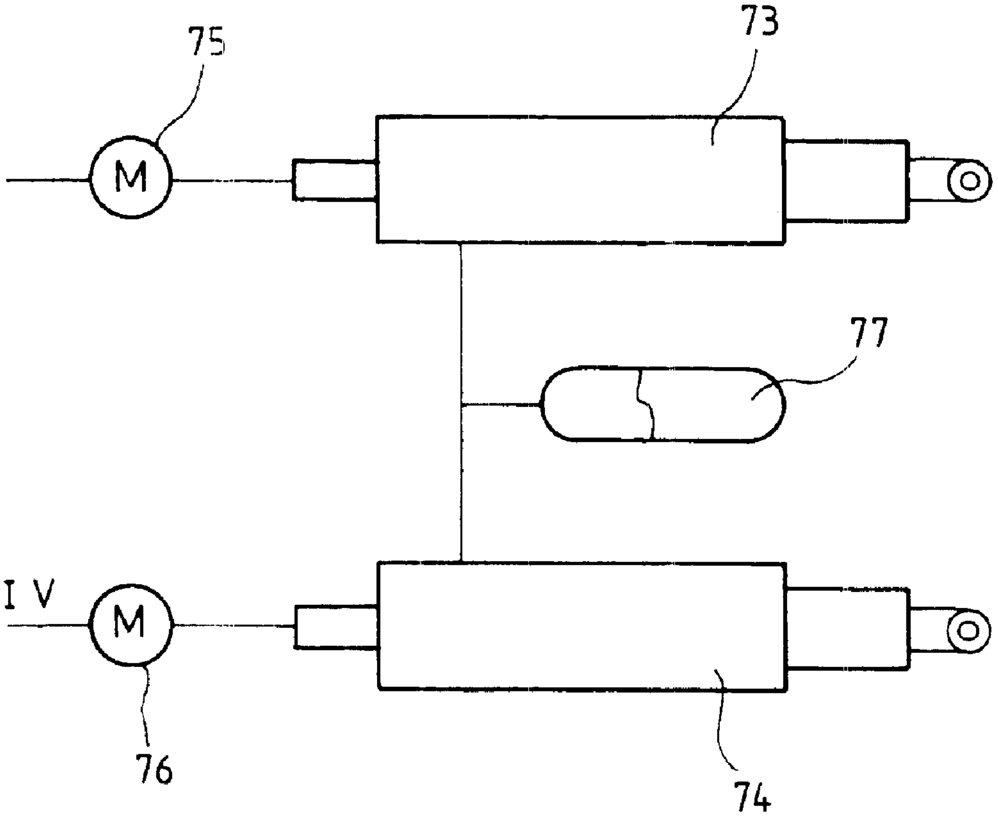
FIG. 4 is a diagrammatic view of actuators in accordance with one aspect of the invention supplied by a common hydraulic power supply.

FIG. 4 shows an example of the disposition of two actuators 73 and 74 as described previously, supplied by a hydropneumatic accumulator 77 common to the two actuators 73 and 74, whose positions are controlled by the reversible electric motors 75 and 76 which drive rotation of the screws 40 of the actuators 73 and 74, respectively. The means for transmitting mechanical power being the only means of controlling the position of the actuators, a plurality of actuators can use the same hydraulic supply without this impeding their individual operation or their synchronization, provided that the hydraulic power is sufficient. In the case of actuators synchronized differently at all times, the average pressure contained in a hydropneumatic accumulator used as a common hydraulic power supply can be greater than that of a hydropneumatic accumulator used for one actuator. The actuators can have different orientations that are modified during kinematic movements of the device. Flexible pipes are then used for the hydraulic power supply circuit.

As an alternative to the above, a system can include actuators according to the invention having an architecture that reproduces completely or in part and/or combines the dispositions illustrated by FIGS. 2 to 4. The examples illustrated by FIGS. 2 to 4 are not limiting on the invention.

One embodiment can use an electric motor as a mechanical power supply, a battery to supply power to the electric motor, and a reversible screw-and-nut system. When the actuator is used to slow down the movement of the load, a portion of the energy can be recovered via the screw-and-nut and the electric motor, to recharge the battery.

The invention therefore provides an actuator combining means for transmitting hydraulic power and means for transmitting mechanical power. The actuator therefore includes integral load compensation, which can be very easily matched to the load. In accordance with one aspect of the invention, the actuator further includes means for permanently and precisely controlling the stroke of the actuator, a locking device having an infinite number of locking positions and enabling an accurate position to be maintained without additional input of power, and a safety device to prevent unintentional movement of the actuator in the event of failure of the power supply.

What is claimed is:

1. An actuator comprising:

a cylindrical body;

a piston adapted to slide relative to said body;

means for transmitting mechanical power to said piston, comprising a non-reversible screw and nut motorized system linked to said piston and adapted for controlling a position of said piston; and means for transmitting hydraulic power to said piston, using a fluid under pressure, said means for transmitting mechanical power and said means for transmitting hydraulic power being adapted to act in parallel with each other on the piston, said hydraulic power being supplied by a hydraulic energy reservoir connected to a single volume defined by a wall of the piston, a hydraulic circuit comprising a pipe being connected between said reservoir and said volume, said hydraulic reservoir being adapted to recover, hydraulic power, said non-reversible screw and nut motorized system constituting a fail safe device for locking the position of the piston, and said non-reversible screw and nut motorized system constituting a synchronizing mechanism for a multi-actuators system.

2. The actuator according to claim 1, wherein the mechanical power is furnished by a coupled motor.

3. The actuator according to claim 1, further comprising a control system for said motor for controlling the position of said piston.

4. The actuator according to claim 1, wherein the screw-and-nut system includes a safety brake.

5. The actuator according to claim 1, wherein said hydraulic power is supplied by a hydropneumatic accumulator.

6. The actuator according to claim 1, wherein said means for transmitting mechanical power and said means for transmitting hydraulic power are disposed coaxially.

7. The actuator according to claim 1, wherein said means for transmitting hydraulic power surround said means for transmitting mechanical power.

8. The actuator according to claim 1, further comprising a control and synchronization interface.

9. A system comprising at least two actuators according to claim 1, and comprising a source of mechanical power supplying mechanical power to the actuators for their mechanical synchronization.

10. A system comprising at least two actuators according to claim 1, and comprising a source of mechanical power associated to each actuator and a central control unit for the mechanical synchronization of the actuators.

11. A system comprising at least two actuators according to claim 1, and comprising a common source of hydraulic power for the actuators.

12. An actuator comprising:

a cylindrical body;

a piston adapted to slide relative to said body;

means for transmitting mechanical power to said piston, comprising a non-reversible screw and nut motorized system linked to said piston and adapted for controlling a position of said piston; and means for transmitting hydraulic power to said piston, said means for transmitting mechanical power and said means for transmitting hydraulic power being separated and adapted to act in parallel with each other on the piston, said hydraulic power being supplied by a hydraulic energy reservoir connected to a single volume defined by a wall of the piston, a hydraulic circuit comprising a pipe being connected between said reservoir and said volume, said hydraulic reservoir being adapted to recover hydraulic power, said non-reversible screw and nut system constituting a locking system of the piston.

13. An actuator comprising:

a cylindrical body;

a piston adapted to slide relative to said body;

means for transmitting mechanical power to said piston, comprising a non-reversible screw and nut motorized system linked to said piston and adapted for controlling a position of said piston, means for transmitting hydraulic power to said piston, using a fluid under pressure, said means for transmitting mechanical power and said means for transmitting hydraulic power being separated and adapted to act in parallel with each other on the piston, said hydraulic power being supplied by a hydraulic energy reservoir connected to a single volume defined by a wall of the piston, a hydraulic circuit comprising a pipe connected between said reservoir and said volume, said hydraulic reservoir being adapted to recover hydraulic power, said non-reversible screw and nut motorized system constituting a failsafe device for locking the position of the piston.

* * * * *